US008809706B2

(12) United States Patent
Christenson et al.

(10) Patent No.: US 8,809,706 B2
(45) Date of Patent: Aug. 19, 2014

(54) INTEGRATING IMPACT SWITCH

(71) Applicant: HT MicroAnalytical, Inc., Albuquerque, NM (US)

(72) Inventors: Todd Richard Christenson, Albuquerque, NM (US); Jeffry Joseph Sniegowski, Tijeras, NM (US)

(73) Assignee: HT MicroAnalytical, Inc., Albuquerque, NM (US)

( * ) Notice: Subject to any disclaimer, the term of this patent is extended or adjusted under 35 U.S.C. 154(b) by 0 days.

(21) Appl. No.: 13/934,602

(22) Filed: Jul. 3, 2013

(65) Prior Publication Data

US 2013/0301182 A1 Nov. 14, 2013

Related U.S. Application Data

(63) Continuation of application No. 13/032,840, filed on Feb. 23, 2011, now Pat. No. 8,507,813.

(51) Int. Cl.

*G01P 15/135* (2006.01)
*H01H 35/02* (2006.01)
*H01H 35/14* (2006.01)

(52) U.S. Cl.

USPC .................................................... 200/61.45 R

(58) Field of Classification Search

USPC .......... 200/61.45 R, 61.04, 61.05, 81 R, 81.4, 200/81.6, 81.9 R, 82 R, 83 R, 83 Y, 82 A, 200/83 A, 83 J, 33 R

See application file for complete search history.

(56) References Cited

U.S. PATENT DOCUMENTS

| | | | | |
|---|---|---|---|---|
| 2,938,461 | A | 5/1960 | Rabinow | |
| 2,983,800 | A | 5/1961 | Rabinow | |
| 3,899,649 | A | 8/1975 | Jenkins | |
| 4,174,666 | A | 11/1979 | Lucey, Jr. et al. | |
| 4,900,880 | A | 2/1990 | Breed | |
| 5,192,838 | A | 3/1993 | Breed et al. | |
| 5,705,767 | A | 1/1998 | Robinson | |
| 5,828,138 | A * | 10/1998 | McIver et al. | 307/10.1 |
| 6,064,013 | A * | 5/2000 | Robinson | 200/61.53 |
| 6,765,160 | B1 | 7/2004 | Robinson | |
| 7,289,009 | B1 | 10/2007 | Christenson et al. | |
| 7,633,362 | B1 | 12/2009 | Christenson et al. | |

* cited by examiner

*Primary Examiner* — Renee S Luebke
*Assistant Examiner* — Anthony R. Jimenez
(74) *Attorney, Agent, or Firm* — Kaplan Breyer Schwarz & Ottesen, LLP

(57) ABSTRACT

An integrating impact switch that can discriminate between accelerations due to different stimuli is provided. Embodiments of the present invention actuate only in response to an acceleration whose magnitude is equal to or greater than an acceleration threshold for a predetermined continuous period of time. Embodiments of the present invention comprise an impact switch having a throw that is operatively coupled with a viscous damper that dampens motion of the throw. As a result, a stimulus that imparts an acceleration that meets or exceeds an acceleration threshold for a time period less than a predetermined time-period threshold does not actuate the switch. A stimulus that imparts an acceleration whose magnitude is equal to or greater than the acceleration threshold for a time period equal to the time-period threshold, however, does actuate the switch.

14 Claims, 12 Drawing Sheets

INTEGRATING IMPACT SWITCH

This case is a continuation of co-pending U.S. patent application Ser. No. 13/032,840, filed Feb. 23, 2011, which is incorporated by reference herein.

FIELD OF THE INVENTION

The present invention relates to inertial switches in general, and, more particularly, to impact switches.

BACKGROUND OF THE INVENTION

An impact switch actuates in response to an acceleration having a magnitude that exceeds a predetermined acceleration threshold. Impact switches are widely used in military applications, such as safing-and-arming and/or detonation systems in munitions (e.g., artillery shells, missile warheads, armor-piercing projectiles, etc.), and non-military applications, such as damage monitoring systems for shipping containers, vehicle air bag deployment systems, and automatic seat belt tensioning systems.

Military applications present some rather unique challenges to the use of impact switches for acceleration detection. First, a munition, such as an artillery shell, must reliably distinguish acceleration due to the firing of the round (i.e., "setback" acceleration) from accelerations due to non-firing-related "environmental events," such as incidental shock and vibration. The ability to distinguish between these accelerations mitigates the potential for accidentally induced detonation from accelerations that arise during handling and transport, by incoming enemy artillery rounds, etc.

Second, the munition must be able to reliably detect acceleration due to impact. Failure of a munition to detonate upon impact reduces the effectiveness of its launch system, endangering it and its associated personnel. Further, undetonated ordinance remains a hazard to human life and property at its landing site until the munition is removed, safely detonated or disarmed, which can be extremely expensive and dangerous.

Many approaches have been reported in the prior art for safing, arming, and detonating a munition. In some approaches, an impact switch arms a munition based solely on detection of setback acceleration, which is typically tens to thousands of G's in magnitude. In other approaches, setback acceleration is not detected but a spin-rate sensor or rotationally activated switch that senses or reacts to angular acceleration due to the spinning of a munition (hundreds to thousands of rotations per second (rps)) is used to arm the projectile. In some approaches, a munition is armed only when both setback and angular accelerations are detected. In most prior-art systems, a separate impact switch is used to detonate the munition at impact.

Numerous impact switches have been developed in the prior art. Simple mechanical impact switches include crush-switches, deformable switches, or spring-loaded fuze-type elements, such as those disclosed in U.S. Pat. Nos. 6,765,160, 4,174,666, 2,938,461, and 2,983,800. Unfortunately, such switches actuate in response to any acceleration that exceeds a magnitude threshold and, therefore, provide little or no protection from inadvertent actuation.

Damped-response impact switches have been developed to provide some discrimination between spurious accelerations and accelerations due to a launch event. In some prior-art switches, magnetic damping has been exploited to provide a damped switch response, such as switches disclosed in U.S. Pat. Nos. 7,289,009 and 7,633,362. In other prior-art switches, mechanical integrators or fluidic systems have been used to provide a damped switch response, such as is disclosed in U.S. Pat. Nos. 4,900,880, 5,192,838, 5,705,767, and 5,272,293.

Unfortunately, such prior-art impact switches have several disadvantages. First, attaining a proper level of damping has proven challenging. In addition, more complicated mechanical systems require precision assembly and fabrication, which significantly increases switch cost. Further, complicated mechanical systems are more prone to failure. Still further, a drive toward "smart weaponry" has made miniaturization of systems such as impact switches highly desirable and many prior-art approaches toward damped impact switches make miniaturization difficult, if not impossible.

An impact switch having a damped response that is inexpensive, reliable, and compact, therefore, would represent a significant advance in the state-of-the-art.

SUMMARY OF THE INVENTION

The present invention provides an integrating impact switch that overcomes some of the costs and disadvantages of the prior art. Switches in accordance with the present invention actuate only in response to an applied acceleration that (1) exceeds a predetermined design threshold and (2) exceeds this threshold for a predetermined continuous period of time. Embodiments of the present invention are particularly well suited for use in applications such as weapons safing and detonation systems.

The illustrative embodiment of the present invention comprises an impact switch having a first electrical contact that is stationary and a second electrical contact that is movable. The second electrical contact is physically coupled with a proof mass to collectively define a throw. The region between the first and second electrical contacts represents a first reservoir for a fluid. In response to an applied acceleration, the throw moves the second contact toward closure with the first contact thereby forcing fluid out of the first reservoir and into a second reservoir that is located on the opposite side of the throw. The fluid travels between the reservoirs through passages that restrict fluid flow, which gives rise to viscous friction that serves to dampen the motion of the throw (a.k.a., "gas pumping"). Additional damping of the motion of the throw arises due to squeeze film damping in the first reservoir that is located between the throw and the first electrical contact.

The induced damping retards the motion of the moving contact and lengthens the time required for the second contact to close with the stationary first contact. In order to actuate the switch, acceleration applied to the switch must be sustained through the entire time required to close the contacts. As a result, embodiments of the present invention to passively differentiate between, for example, incidental shock, vibration, etc., and accelerations due to munition launch and impact.

In some embodiments, a damped switch is operatively coupled with a viscous damper that adds additional damping to the actuation of the switch. The throw of the switch is mechanically coupled with one or more pistons that are included in the viscous damper. The pistons are attached to a plate that resides in a third reservoir that is fluidically coupled with the second reservoir. In some embodiments, the viscous damper is analogous to a dashpot.

Each piston resides in a channel to define narrow passages through which fluid flows between the second and third reservoirs. Movement of the throw induces motion of the plate within the second reservoir, which drives fluid from the third reservoir, through these narrow passages, and into the second reservoir. The narrow passages limit the flow rate between the third reservoir and second reservoir, which retards the motion of the plate within the third reservoir. Since the plate is mechanically coupled with the throw, motion of the throw is also slowed. As a result, the addition of the viscous damper augments the damping characteristics of the switch to which the dashpot is coupled.

In some embodiments, a switch having no significant internal damping mechanism is operatively coupled to a viscous damper.

An embodiment of the present invention comprises: a first electrical contact; a second electrical contact, wherein the second electrical contact is dimensioned and arranged to move with a first motion toward the first electrical contact in response to a first acceleration; a first reservoir containing a first fluid, wherein the volume of the first reservoir is based on the separation between the first contact and the second contact; and a second reservoir that is fluidically coupled with the first reservoir through a passage, wherein the flow rate of the first fluid between the first reservoir and second reservoir is based on a dimension of the passage; wherein the first motion is based on (1) the first acceleration and (2) the flow rate of a flow of the first fluid from the first reservoir to the second reservoir.

DETAILED DESCRIPTION

Figure 1:
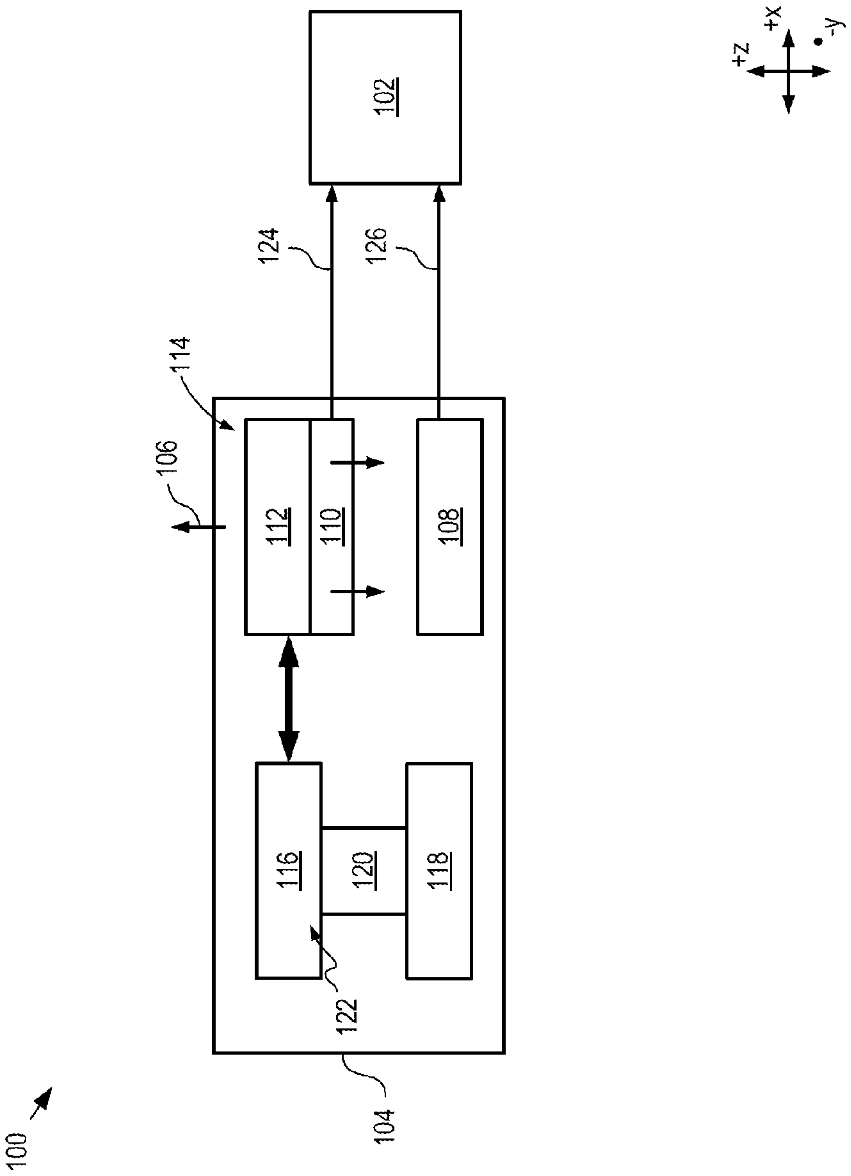
FIG. 1 depicts a schematic diagram of detonation system in accordance with an illustrative embodiment of the present invention.

FIG. 1 depicts a schematic diagram of detonation system in accordance with an illustrative embodiment of the present invention. Detonation system 100 comprises detonation circuit 102 and integrating impact switch 104.

Detonation circuit 102 is a conventional prior-art munitions detonation circuit.

Switch 104 senses acceleration 106 and provides an indication of the sensed acceleration to detonation circuit 102 on signal lines 124 and 126. Typically, this indication is an electrical short between signal lines 124 and 126; however, in some embodiments the indication is a current pulse, voltage level change, capacitance change, etc.

Switch 104 is an integrating impact switch that actuates in response to an acceleration that continuously exceeds a threshold magnitude for a predetermined minimum period of time. Embodiments of the present invention are suitable for use in munition detonation systems (e.g., an artillery round, missile warhead, armor-piercing projectile, etc.), damage monitoring systems for shipping containers, vehicle air bag deployment systems, automatic seat belt tensioning systems, and the like. Switch 104 comprises electrical contacts 108 and 110, proof mass 112, reservoirs 116 and 118, and fluid 122.

Electrical contact 108 is an electrical contact whose position within reservoir 106 is fixed.

Electrical contact 110 is an electrical contact that is movable with respect to electrical contact 108. Electrical contact 110 is physically coupled with proof mass 112. Electrical contact 110 and proof mass 112 collectively define throw 114.

Reservoir 116 is a first region of switch 104 that contains fluid 122. Reservoir 116 is operatively coupled with throw 114 such that its volume is based on the position of throw 114 with respect to electrical contact 108. As a result, motion of throw 114 changes the volume of fluid 122 in reservoir 116.

Reservoir 118 is a second region of switch 104. Reservoir 118 is fluidically coupled with reservoir 116 via channel 120 such that fluid 122 is exchanged between the two reservoirs through the channel.

When a munition comprising detonation system 100 is subject to an impact force, acceleration 106 is imparted on switch 104 along the z-direction. One skilled in the art will recognize that, in many cases, acceleration 106 is only one component of an acceleration imparted on the munition along a direction other than the z-direction. In response to acceleration 106, throw 114 moves toward electrical contact 108 to bring electrical contact 110 into physical and electrical contact with electrical contact 108. As throw 114 moves toward electrical contact 108, it displaces fluid 122 from reservoir 116. This displaced fluid is driven through channel 120 into reservoir 118.

In the illustrative embodiment, fluid 122 is air; however, it will be clear to one skilled in the art, after reading this specification, how to make and use alternative embodiments of the present invention wherein fluid 122 is another fluid such as, a compressible fluid, an inert gas (e.g., forming gas, nitrogen, etc.), a non-compressible fluid, a non-conductive fluid (e.g., hydraulic fluid, etc.), or any other suitable fluid. In some embodiments, the pressure within reservoir 106 is controlled to facilitate damping of the motion of electrical contact 112.

As described below in a section entitled "Switch Operation," it is an aspect of the present invention that throw 112, reservoirs 116 and 118, and channels 120 are dimensioned and arranged to control the flow characteristics of fluid 122 through channel 120. Throw 112, reservoirs 116 and 118, and channels 120 collectively define a "viscous damper." For the purposes of this specification, including the appended claims, a "viscous damper" is defined as a system that damps the motion of a moving element, wherein the damping arises from viscous friction associated with a flow of fluid through a channel that fluidically couples first reservoir and second reservoir. In some embodiments, switch 104 operates in manner that is analogous to the operation of a dashpot. As a result, motion of throw 114 is retarded (i.e., damped) by the need for fluid 122 to flow out of reservoir 116. Sustained acceleration above a predetermined threshold of switch 104, however, enables the switch to overcome the damping and close electrical contacts 108 and 110. In other words, switch 104 actuates only in response to a predetermined acceleration-time event. That is, switch 104 actuates only when acceleration 106 both exceeds a predetermined acceleration threshold and exceeds this threshold for a minimum period of time.

Typically, switch 104 indicates detection of acceleration 106 by electrically shorting signal lines 124 and 126 together; however, in some embodiments of the present invention, switch 104 provides a different indication, such as an electrical signal (e.g., a voltage or current signal, etc.), to detonation circuit 102.

Figure 2A:
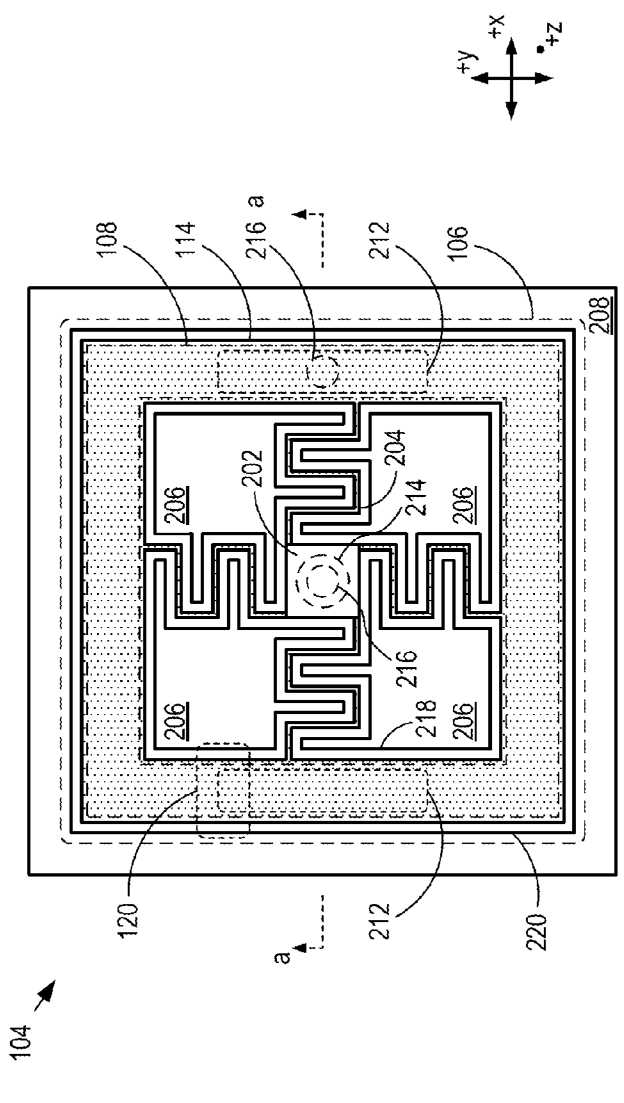
FIG. 2A depicts a schematic drawing of a top view of an integrating impact switch in accordance with the illustrative embodiment of the present invention.
Figure 2B:
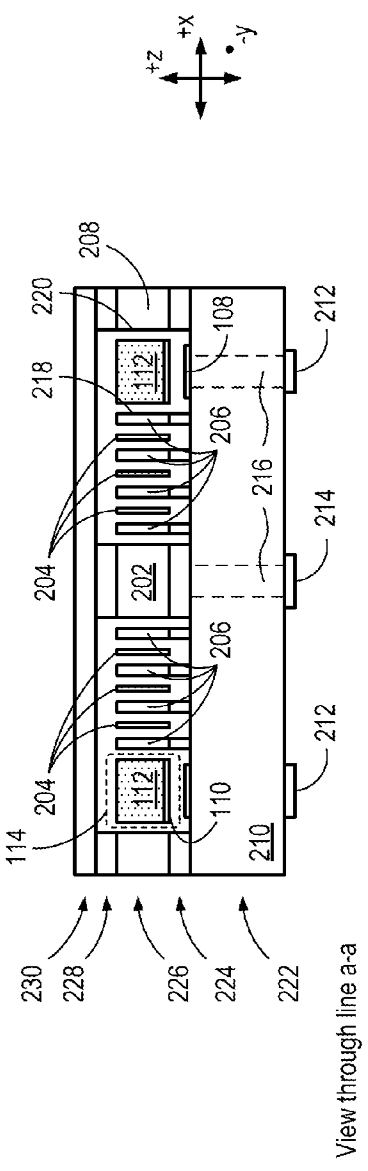
FIG. 2B depicts a schematic drawing of a sectional view of an integrating impact switch in accordance with the illustrative embodiment of the present invention.

FIGS. 2A and 2B depict schematic drawings of top and cross-section views, respectively, of an integrating impact switch in accordance with the illustrative embodiment of the present invention. Switch 104 comprises contact module 222, spacer layer 224, throw module 226, spacer layer 228, and cap 230. Contact module 222, spacer layer 224, throw module 226, spacer layer 228, and cap 230 collectively define reservoir 106.

Figure 3:
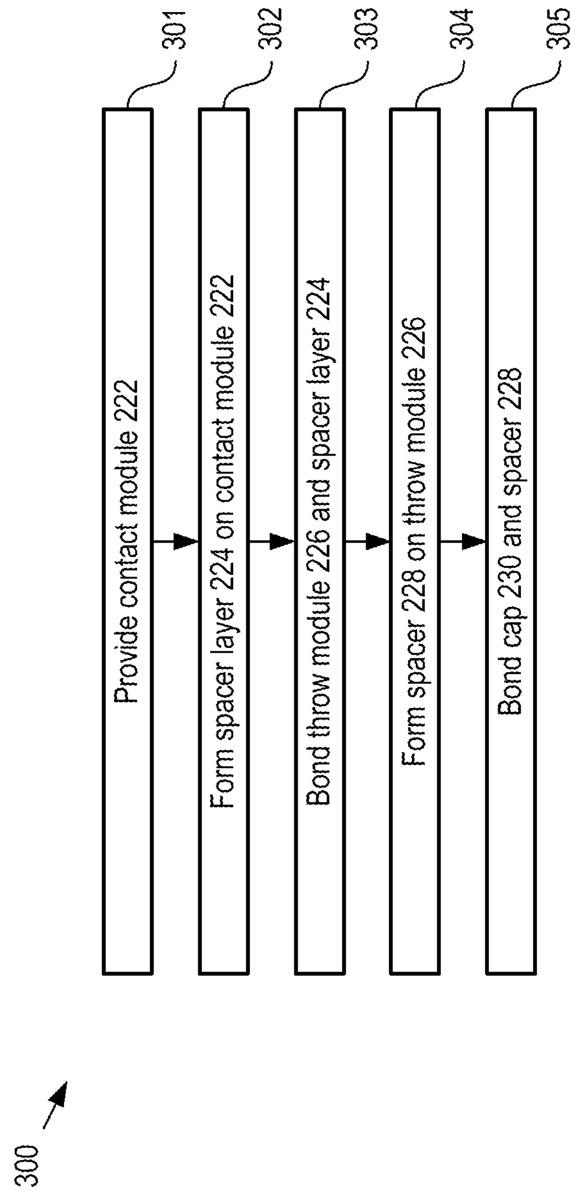
FIG. 3 depicts operations of a method suitable for forming an integrating impact switch in accordance with the illustrative embodiment of the present invention.

FIG. 3 depicts operations of a method suitable for forming an integrating impact switch in accordance with the illustrative embodiment of the present invention. Method 300 begins with operation 301, wherein contact module 222 is provided. Method 300 is described with continuing reference to FIGS. 2A-B and additional reference to FIGS. 4A-4F.

Figures 4A, 4B, 4C:
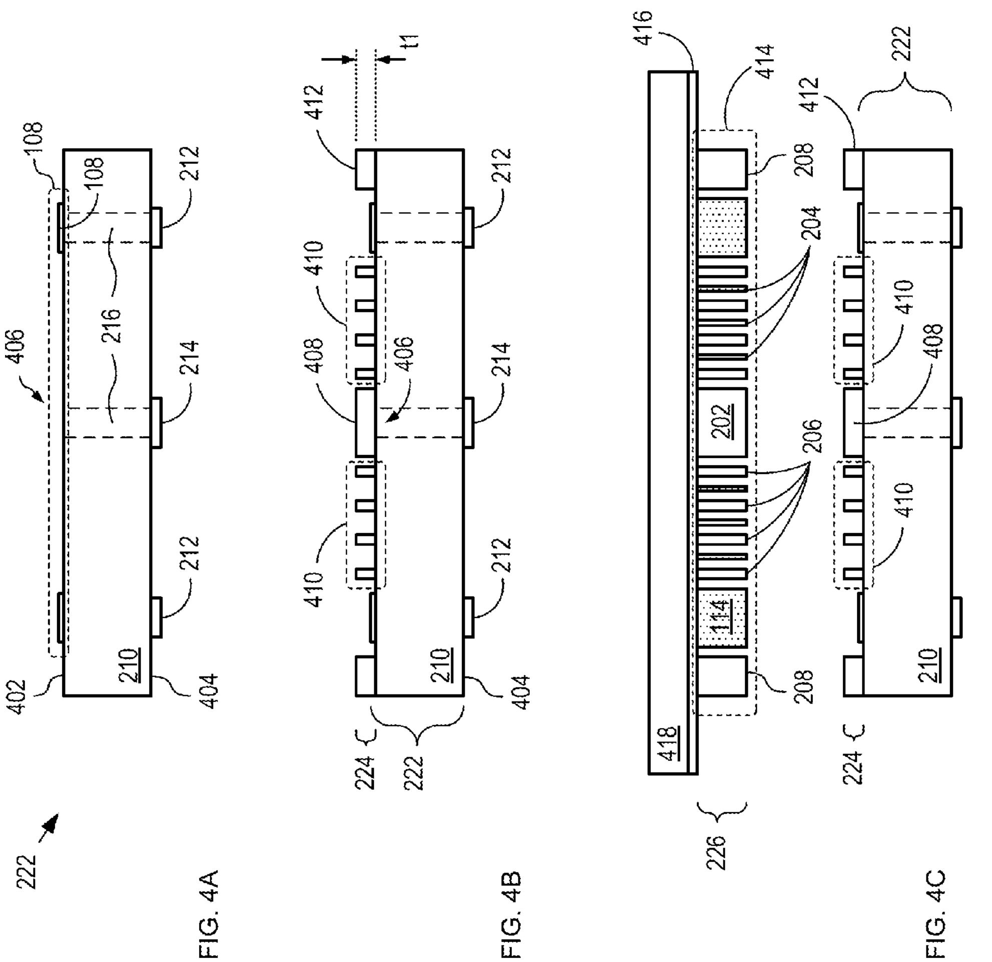
FIGS. 4A-F depict schematic drawings of a cross-section view of an integrating impact switch at different points during its fabrication in accordance with the illustrative embodiment of the present invention.

FIG. 4A depicts a schematic drawing of a cross-sectional view of a contact module in accordance with the illustrative embodiment of the present invention. Contact module 222 comprises substrate 210, contact pads 212 and 214, through-wafer vias 216, and electrical contact 108.

Substrate 210 is substantially rigid plate of electrically non-conductive material having a thickness suitable for supporting fabrication of electrical contact 108, contact pads 212 and 214, and through-wafer vias 216. Electrically non-conductive materials suitable for use in substrate 210 include alumina, ceramics, glasses, and the like. In some embodiments, substrate 210 is a plate of electrically conductive material, such as a metal (e.g., aluminum, copper, nickel, nickel alloy, etc.). In embodiments wherein substrate 210 is electrically conductive, insulating material is disposed on surfaces 402 and 404, as well as the interior surfaces of holes in which through-wafer vias 216 are formed. This insulating material enables electrical isolation between elements disposed on these surfaces.

Electrical contact 108 is an annulus of electrically conductive material disposed on surface 402 of substrate 210. Typically, electrical contact 108 has a thickness within the range of approximately 200 angstroms to approximately one micron. Electrical contact 108 is formed using conventional metal deposition method, such as electroplating, evaporation, sputtering, and the like. Materials suitable for use in electrical contact 108 include, without limitation, gold, copper, aluminum, platinum, rhodium, ruthenium, titanium nitride, and the like.

Each of contact pads 212 is a substantially rectangular shaped region of electrically conductive material disposed on surface 404 of substrate 210. Although only one contact pad 212 is necessary, two contact pads 212 are provided to facilitate the solder bonding of switch 104 to an electrical circuit that comprises signal lines 124 and 126. In some embodiments, contact pad 212 has a shape other than a rectangle, such as an annulus, circle, etc. Contact pad 212 and electrical contact 108 are electrically connected by an electrically conductive through-wafer via 216, which extends through substrate 210 between surfaces 402 and 404. Through-wafer vias 216 provide electrical connectivity between regions of surface 402 and regions of surface 404.

Contact pad 214 is a substantially circular region of electrically conductive material disposed on surface 404 of substrate 210. Contact pad 214 is electrically coupled to region 406 of surface 402. It will be clear to one skilled in the art how to specify, make, and use through-wafer vias 216 and contact pads 212 and 214.

At operation 302, spacer layer 224 is formed on surface 402 of substrate 210.

FIG. 4B depicts a schematic drawing of a cross-section view of switch 104 after the formation of spacer layer 224 on contact module 222.

Spacer layer 224 is a layer of material, typically comprising gold, that is suitable for forming a bond between substrate 210 and throw module 226. Spacer layer 224 has a thickness, t1, of approximately 26 microns. Spacer layer 224 is formed by means of conventional electroplating techniques. In some embodiments, t1 is within the range of approximately 10 micron to approximately 30 microns. In some embodiments, t1 is within the range of approximately 1 micron to approximately 100 microns. Although spacer layer 224 comprises gold, it will be clear to one skilled in the art, after reading this specification, how to specify, make, and use alternative embodiments of the present invention wherein spacer layer 224 comprises a metal other than gold, such as copper, nickel, nickel alloy, and the like. In some embodiments, spacer layer 224 is a pre-form comprising a material that is suitable for bonding substrate 210 and throw layer 226. Materials suitable for use in spacer layer 224 include, without limitation, metals, epoxies, metal-filled epoxies, dielectrics (e.g., silicon nitride, silicon carbide, silicon dioxide, etc.), polymers, and the like. In some embodiments, spacer layer 224 is a material that inhibits bonding to the material of throw module 226 but the top surface of spacer layer 224 is coated with a suitable bonding material (e.g., gold).

Spacer layer 224 comprises regions 408, 410, and 412.

Region 408 is disposed on region 406 and is electrically connected with contact pad 214 by means of a through-wafer via 216. Region 408 is a bonding surface for receiving anchor 202 of throw module 226.

Regions 410 are bonding surfaces for receiving barriers 206 of throw module 226.

Regions 412 are bonding surfaces for receiving housing 208 of throw module 226. Regions 410 and 412 are disposed on surface 402 of substrate 210.

The thickness of spacer layer 224 determines the quiescent separation between electrical contacts 108 and 110.

Although in the illustrative embodiment, spacer layer 224 is formed on contact module 222, it will be clear to one skilled in the art, after reading this specification, how to specify, make, and use alternative embodiments wherein spacer layer 224 is formed on throw module 226, or formed as a separate element that is aligned and bonded to at least one of contact module 222 or throw module 226.

At operation 303, throw module 226 is aligned and bonded to spacer layer 224.

FIG. 4C depicts a schematic drawing of a cross-section view of switch 104 while throw module 226 and contact module 222 are aligned but prior to their being bonded.

Throw module 226 comprises layer 414, which is a metal layer comprising nickel. Layer 414 has a thickness of approximately 460 microns. In some embodiments layer 414 has a thickness within the range of approximately 1 micron to approximately 1000 microns. Layer 414 comprises anchor 202, tethers 204, barriers 206, throw 114, and housing 208. Although the illustrative embodiment comprises a throw module comprising nickel, it will be clear to one skilled in the art, after reading this specification, how to specify, make, and use alternative embodiments of the present invention wherein throw layer comprises a material other than nickel. Materials suitable for use in throw module 226 include, without limitation, copper, nickel alloys, Permalloy, plastics, ceramics, semiconductors, dielectrics, glasses, and the like.

Layer 414 is formed on release layer 416, which is disposed on handle substrate 418. Layer 414 is formed by means of conventional electroplating techniques. In some embodiments, layer 414 is formed by deposition of a continuous layer of structural material, which is etched to form anchor 202, tethers 204, barriers 206, throw 114, and housing 208 using high-aspect ratio etching.

Throw 114 comprises proof mass 112 and electrical contact 110. In the illustrative embodiment, proof mass 112 comprises electrically conductive material and electrical contact 110 is the bottom surface of proof mass 112 (i.e., the surface of proof mass 112 that is proximal to electrical contact 108). In some alternative embodiments, electrical contact 110 is a layer of electrically conductive material disposed on the bottom surface of proof mass 112.

Release layer 416 is a layer of material that is selectively removable after throw module is bonded with contact module 222. Removal of release layer 418 enables the removal of handle substrate 418 without damage to the structures included in layer 414. Handle substrate 418 is a structurally rigid substrate that comprises a material compatible with the formation and removal of release layer 416 and the formation of layer 414.

As depicted in FIG. 2A, anchor 202 is a structurally rigid substantially square-shaped region of layer 414. Anchor 202 has sides of approximately 100 microns. In some embodiments, anchor 202 has other than a square shape and/or has a size other than 100 microns on a side.

Throw 114 is a substantially square annular region of layer 414 that comprises electrical contact 110 and proof mass 112. Throw 114 surrounds anchor 202. Throw 114 has an exterior diameter of approximately 496 microns and an interior diameter of approximately 264 microns. Throw 114 (and, therefore, electrical contact 110) is electrically coupled with signal line 124 by through-wafer via 216 and contact pad 214.

Throw 114 serves several purposes in switch 104. First, throw 114 acts as a proof mass that moves relative to electrical contact 108 in response to an acceleration of switch 100 directed along the z-direction. The motion of throw 114 enables physical and electrical contact between electrical contacts 108 and 110. Second, throw 114 restricts the flow of fluid 122 from reservoir 116 to region 118 through channel 120. As a result, the dimensions of throw 114 and channel 120 collectively determine the damping effect due to viscous friction of the flow of fluid 110 through channel 120. Third, the lower surface of throw 114 and electrical contact 108, and the separation between them, collectively determine the damping effect due to squeeze-film damping in reservoir 116. The design of each of throw 114 and electrical contact 108 is based on the degree of squeeze-film damping desired.

Tethers 204 are serpentine spring-like elements that physically couple anchor 202 and electrical contact 114. During operation of switch 104, tethers 204 support electrical contact 114 above electrical contact 108 and enable motion of throw 114 with respect to electrical contact 108. Each of the constituent beams of tethers 204 has a thickness of approximately 10 microns. As a result, tethers 204 are flexible in the z-direction. In some embodiments, tethers 204 are designed to limit motion to only the z-dimension. In some embodiments, tethers 204 are designed to limit motion only to a dimension other than the z-direction. In some embodiments, tethers 204 are designed with flexibility in more than one dimension. Although the illustrative embodiment comprises tethers that are folded serpentine springs, it will be clear to one skilled in the art, after reading this specification, how to specify, make, and use alternative embodiments of the present invention wherein tethers 204 are straight beams, L-shaped beams, have a curved serpentine shape, a shape that curves in the x-y plane, a continuously varying dimension, spiral, or any irregular shape. Further, one skilled in the art will recognize, after reading this specification, that tethers 204 can have any suitable thickness (i.e., dimension in the z-direction).

Each of barriers 206 is a region of layer 414 that interleaves tethers 204. Barriers 206 collectively define a substantially square feature having sides of approximately 260 microns.

Housing 208 is an annular region of layer 414 having an interior dimension of approximately 500 microns per side. Housing 208 has a volume large enough to enclose anchor 202, tethers 204, electrical contact 108, and throw 114.

Although in the illustrative embodiment, each of throw 114 and housing 208 is a substantially square annulus, it will be clear to one skilled in the art, after reading this specification, how to specify, make, and use alternative embodiments wherein at least one of throw 114 and housing 208 has a shape other than a square annulus.

Figures 4D, 4E, 4F:
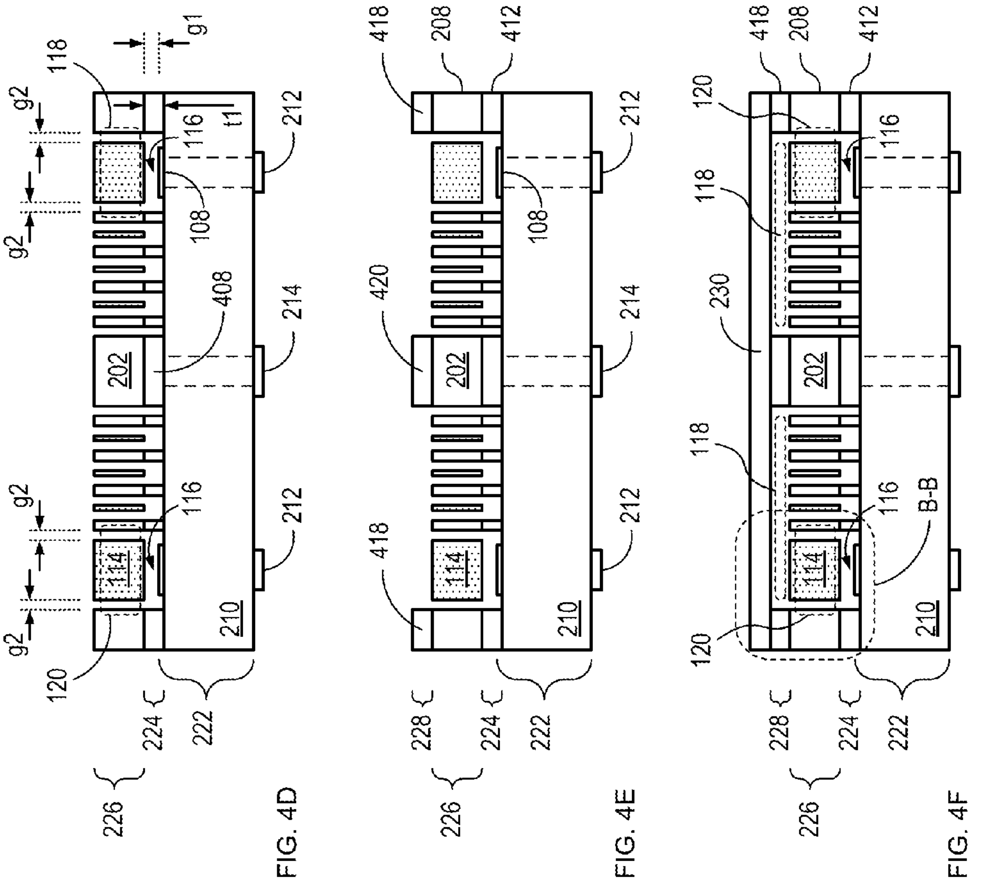

FIG. 4D depicts a schematic drawing of a cross-section view of switch 104 after throw module 226 and contact module 222 have been mechanically coupled.

Once throw module 226 and contact module 222 have been bonded, anchor 202 is attached to region 408, barriers 206 are attached to regions 410, and housing 208 is attached to region 412. Throw 114 and tethers 204, however, are suspended above, and free to move with respect to, contact module 222.

Barriers 206 and housing 208 collectively define annular-shaped channel 120. Throw 114 resides within channel 120. In addition, barriers 206 collectively define channels in which tethers 204 reside. These channels serve to limit the volume of fluid that surrounds tethers 204. Further, barriers 206, housing 208, regions 410 and 412, throw 114 and electrical contact 108 collectively define reservoir 116 and limit its volume.

Referring again to FIG. 2A, it should be noted that the outer perimeter of each of barriers 206 collectively form a nearly continuous vertical wall, wall 218. Wall 218 is broken only by the channels for containing tethers 204, which are formed by each pair of adjacent barriers 206. Wall 218 and sidewall 220 of housing 208 collectively define channel 120.

Throw 114 and each of wall 218 and sidewall 220 collectively define a gap, g2, of approximately 2 microns. In some embodiments, g2 is within the range of approximately 0.5 micron to approximately 10 microns. The width of g2 is based on the desired restriction of fluid flow through channel 120, as discussed below and with respect to the operation of switch 104. One skilled in the art will recognize, after reading this specification, that the lower bound provided for g2 is a function of the processing technology used to produce the switch modules and that as this technology advances, even smaller gaps might be possible.

In some embodiments, gap g2 can be formed with a width that is less than the critical dimension of the processes used in the formation of switch 104. Formation of such gaps is possible by employing a "biased critical dimension" approach wherein the relative sizes of two elements to be nested together (e.g., throw 114 and housing 208) are made only slightly different from one another. As a result, when the modules that comprise these elements are aligned and joined, the difference in their sizes results in extremely small gaps between the elements. In some embodiments, alignment features, such as mechanical stops and precision spheres, etc., are used to ensure proper alignment of the modules during their assembly and bonding. Since the positions of the mechanical stops can be photolithographically defined, high-precision alignment between the modules can be attained.

At operation 304, spacer layer 228 is formed on throw module 226.

FIG. 4E depicts a schematic drawing of a cross-section view of switch 104 after the formation of spacer layer 228 on throw module 226.

Spacer layer 228 is analogous to spacer layer 224 and comprises regions 418 and 420. Spacer layer 228 has a thickness of approximately 26 microns. In some embodiments, spacer layer 228 has a thickness within the range of approximately 6 microns to approximately 100 microns. The thickness of spacer layer 228 determines the thickness of region 118.

Spacer layer 228 comprises regions 418 and 420. Region 418 is a rectangular annulus that is disposed on housing 208. Region 420 is a rectangular region that is disposed on anchor 202. Regions 418 and 420 collectively provide a bonding surface for joining cap 230 and spacer layer 228.

At operation 306, cap 230 is bonded to spacer layer 228 thereby completing the assembly of switch 104. Cap 230 is analogous to substrate 210.

FIG. 4F depicts a schematic drawing of a cross-section view of switch 104 after cap 230 has been bonded to spacer layer 228.

Switch Operation

Figure 4G:
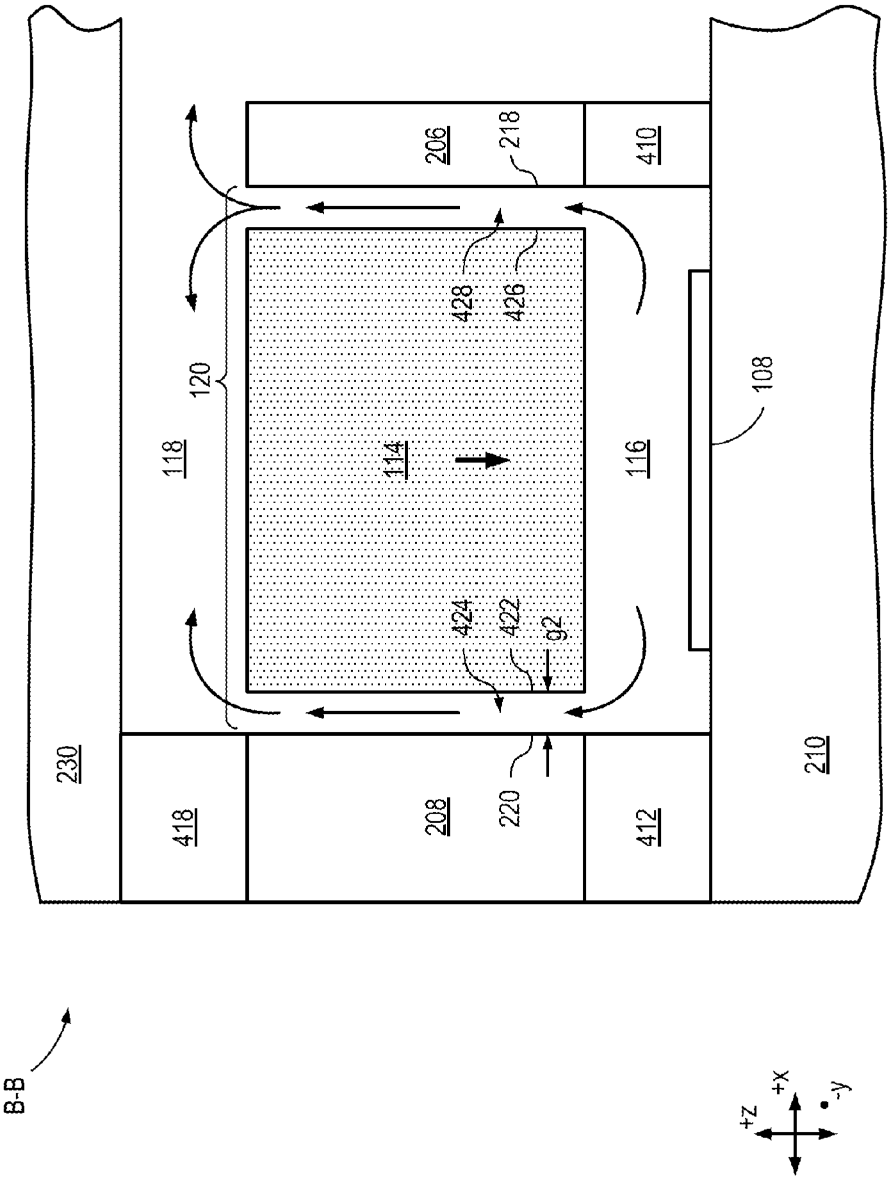
FIG. 4G depicts a close-up view of fluid flow within region B-B during operation of switch 104.

FIG. 4G depicts a schematic drawing of a close-up view of region B-B of switch 104, as shown in FIG. 4F. As depicted in FIG. 4G, the constituent components of switch 104 are dimensioned and arranged to give rise to several phenomena that act to damp the motion of throw 114 (and electrical contact 110) in response to applied acceleration 106. The damped response of switch 104 enables it to actuate in response to a predetermined acceleration-time event.

A first damping phenomenon arises from viscous damping of fluid 122 within channel 120—in particular, passages 424 and 428 of channel 120. Sidewall 220 of region 208 and sidewall 422 of throw 114 collectively define passage 424, which has a width equal to gap, g2. In similar fashion, sidewall 218 of barrier 206 and sidewall 426 of throw 114 collectively define passage 428, which also has a width equal to gap, g2. In some embodiments, passages 424 and 428 have different gap widths. Passages 424 and 428 fluidically couple a first reservoir of fluid 122, specifically reservoir 116, and a second reservoir of fluid 122, specifically region 118.

As throw 114 moves toward electrical contact 108, fluid 122 is forced out of the first reservoir (i.e., reservoir 116), through passages 424 and 428, and into the second reservoir (i.e., region 118). Passages 424 and 428 are dimensioned and arranged so that viscous friction in them limits the flow rate of fluid 122 from the first reservoir to the second reservoir. By limiting this flow rate, the velocity of throw 114 is retarded (i.e., the motion of throw 114 (and, therefore, electrical contact 110) is damped). One skilled in the art will recognize that the viscous friction in channel 120 (i.e., passages 424 and 428) is based on the design of the channel—specifically, its length, cross-sectional area, and the width of gap g2.

A second phenomenon arises from the need to displace fluid 122 from reservoir 116. This phenomenon is commonly referred to as "squeeze-film damping." Squeeze-film damping is a well-known effect that occurs when two surfaces, having a fluid between them, are close to each other and one surface moves closer to the other. As the gap between the two surfaces shrinks, the fluid must flow out of that region. The flow viscosity of fluid 122, therefore, gives rise to a force that resists the motion of moving surface.

In cases wherein fluid 122 is a compressible fluid, the squeeze-film effect gives rise to a third phenomenon due to the compression of fluid that has yet to exit the gap. The compression of this fluid induces a "spring-like" force that further resists the motion of the moving surface.

For example, in the illustrative embodiment, as gap g1 shrinks, fluid 122 flows out of reservoir 116 and into passages 424 and 428. The flow viscosity of the fluid within reservoir 116, however, gives rise to a force on moving throw 114 that resists its downward motion. In addition, fluid 122 is a compressible fluid in the illustrative embodiment (i.e., air); therefore, its compression between electrical contacts 108 and 110 induces a spring force within reservoir 116 that resists the downward motion of electrical contact 110. Collectively, these forces provide a significant damping effect on the motion of throw 114. This damping effect enables embodiments of the present invention to integrate acceleration 106 over time.

Normally, squeeze-film damping is considered a problem to be overcome in a MEMS or nanotechnology system. The present inventors recognized, however, that squeeze-film damping could be employed to advantageously retard the motion of throw 114. In some embodiments of the present invention, therefore, proof mass 110, contact 110 and contact 108 are designed to exploit this phenomenon to augment the damping afforded by the viscous friction of fluid 122 in channel 120.

Figure 5:
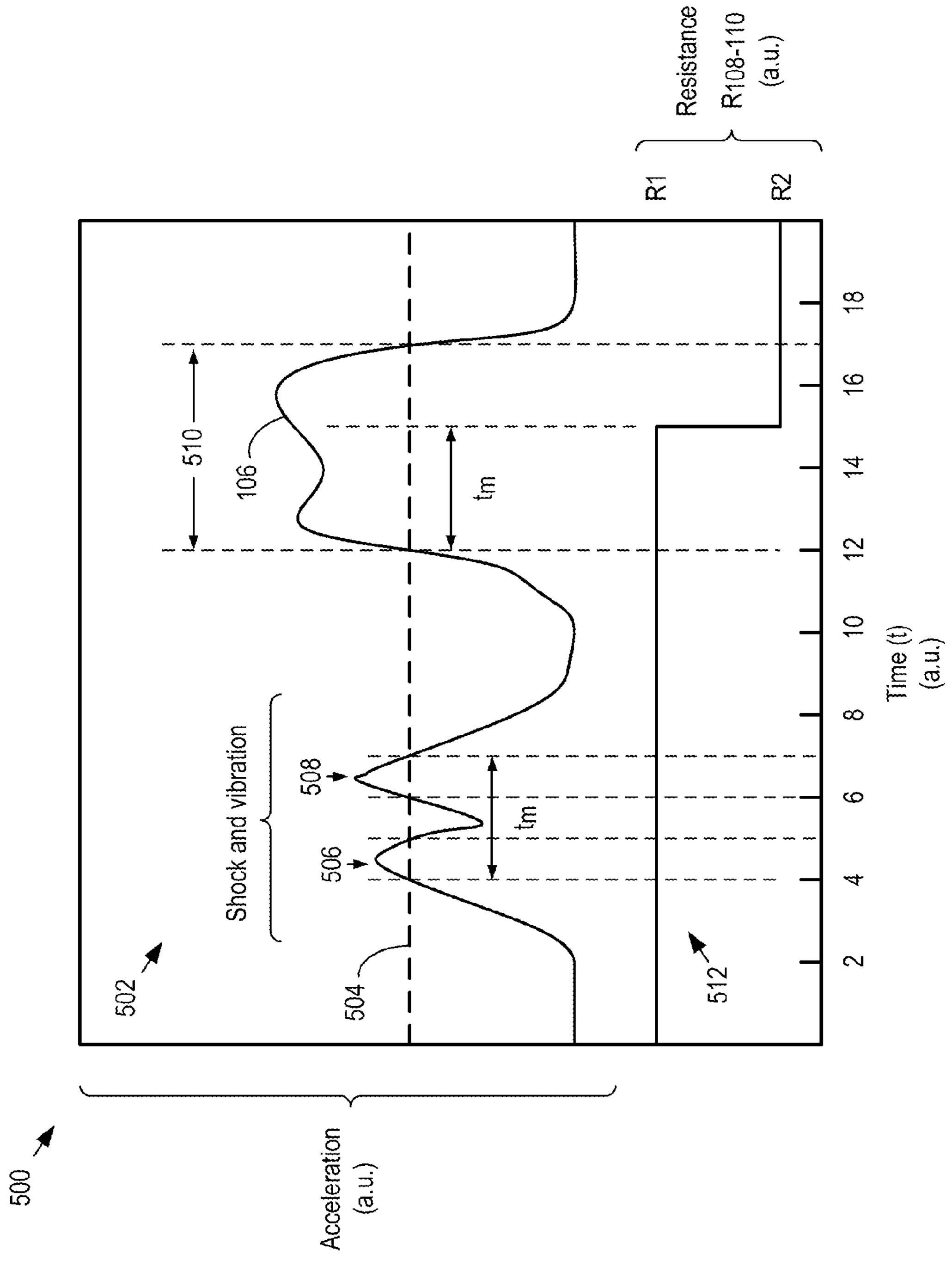
FIG. 5 depicts a representation of a response of an integrating impact switch to applied acceleration in accordance with the illustrative embodiment of the present invention.

FIG. 5 depicts a representation of a response of an integrating impact switch to applied acceleration in accordance with the illustrative embodiment of the present invention. Plot 500 depicts traces 502 and 512, which represent acceleration 106 imparted on switch 104 and the resistance between electrical contacts 108 and 110, respectively, versus time.

Two acceleration events, and the response of switch 104 to them, are depicted in plot 500. First, during the time period from approximately t=2 through approximately t=9, switch 104 is subject to shock and vibration. During time periods 506 and 508, acceleration 106 exceeds acceleration threshold 504. In typical prior-art switches, such shock and vibration could result in unintended switch actuation—potentially with catastrophic consequences.

The actuation response of switch 104 is slowed, however, by the fact that the motion of throw 112 is retarded by viscous damping in channel 120 and squeeze-film damping between electrical contacts 108 and 110. As a result, switch 104 actuates only in response to an acceleration that exceeds acceleration threshold 504 continuously over a time period long enough enable throw 112 to move far enough that electrical contact 110 comes into physical and electrical contact with electrical contact 108. This time period is defined as time-period threshold, $t_m$, which is predetermined by virtue of the design of the components of switch 104. Although the duration of the shock and vibration time period exceeds $t_m$, acceleration 106 is not continuously equal to or higher than acceleration threshold 504 during this period. As a result, the shock and vibration felt between times t=2 and t=9 does not induce switch 104 to actuate.

At approximately time t=10, switch 104 is subject to a second acceleration event in response to munition impact. In response, acceleration 106 crosses acceleration threshold 504 at time t=12. Acceleration 106 is continuously at or above acceleration threshold 504 until approximately time t=17. During this period, specifically at time t=15, time-period threshold $t_m$ is met and throw 112 brings electrical contact 110 into physical and electrical contact with electrical contact 108. As a result, plot 512, which is the resistance between electrical contacts 108 and 110, drops from R1 (open) to R2 (shorted) at time t=15.

It should be noted that the shapes and dimensions of elements of the illustrative embodiment are merely exemplary. One skilled in the art will recognize, after reading this specification, that the elements of switch 104 can have any suitable shapes and/or dimensions that result in desired damping effects due to viscous friction of the flow of fluid 122 though channel 120 and/or squeeze-film damping due to fluid 122 within reservoir 116.

In some embodiments, at least one of housing 208 comprises a material other than alumina. Materials suitable for use in housing 208 include, without limitation, metals, ceramics, plastics, composite materials, glasses, and the like. In some embodiments, substrate 210 comprises a material other than alumina. Materials suitable for use in substrate 210 include, without limitation, metals, ceramics, plastics, composite materials, glasses, and the like.

Figure 6:
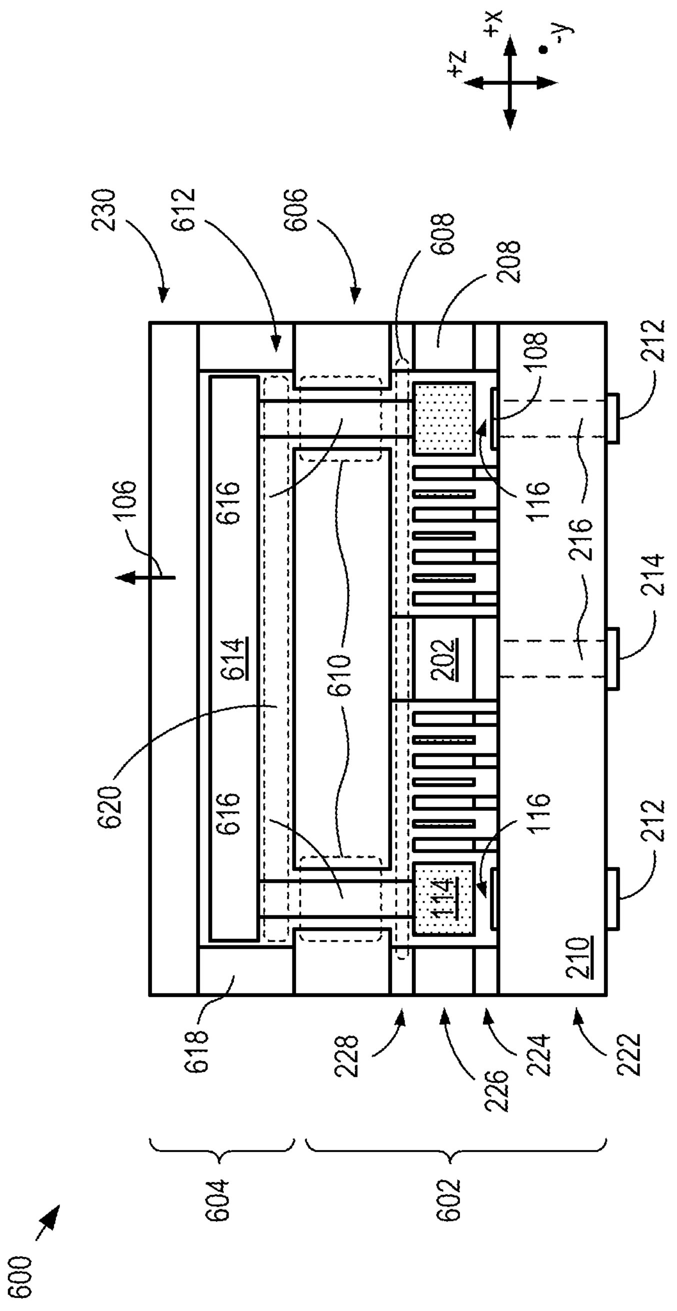
FIG. 6 depicts a schematic drawing of a cross-sectional view of an integrating impact switch in accordance with a first alternative embodiment of the present invention.

FIG. 6 depicts a schematic drawing of a cross-sectional view of an integrating impact switch in accordance with a first alternative embodiment of the present invention. Integrating impact switch 600 comprises switch 602 and viscous damper 604, which is mechanically coupled to throw 114 of switch 602.

Switch 602 is analogous to switch 104 and, like switch 104, comprises contact module 222, spacer layer 224, throw module 226, and spacer layer 228. In addition, switch 602 further comprises cylinder layer 606, which is analogous to cap 230; however, cylinder layer 606 is dimensioned and arranged to enable (1) mechanical coupling between switch 602 and viscous damper 604 and (2) fluidic coupling between reservoirs 116, 608, and 620. Reservoir 608 is analogous to reservoir 118 described above and with respect to FIGS. 1-4G. Contact module 222, spacer layer 224, throw module 226, spacer layer 228, and cylinder layer 606 collectively define reservoir 608. Switch 602, like switch 104, is characterized by a throw whose motion is damped by (1) squeeze-film damping and (2) viscous damping that arises from the flow of fluid 122 from reservoir 116 through channels 120 into reservoir 608.

Viscous damper 604 is a damping element that is operatively coupled with switch 602 to provide additional damping of the response of switch 602. Viscous damper 604 comprises plate 614, pistons 616, and reservoir 620.

Figure 7:
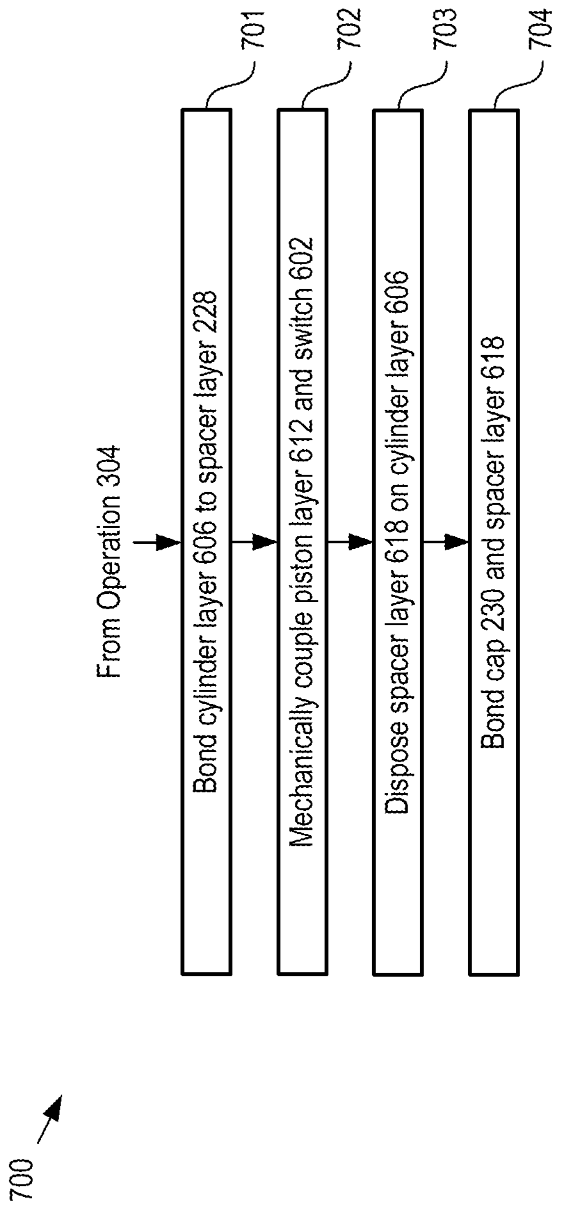
FIG. 7 depicts operations of a method suitable for forming an integrating impact switch in accordance with the first alternative embodiment of the present invention.

FIG. 7 depicts operations of a method suitable for forming an integrating impact switch in accordance with the first alternative embodiment of the present invention. Method 600 is described with continuing reference to FIG. 6 and additional reference to FIGS. 8A-8D. Method 700 begins with operation 701, wherein cylinder layer 606 is provided and bonded to spacer 288. Operation 701 is performed after operation 304 of operation 300, which is described above and with respect to FIGS. 2A-4F.

Figure 8A:
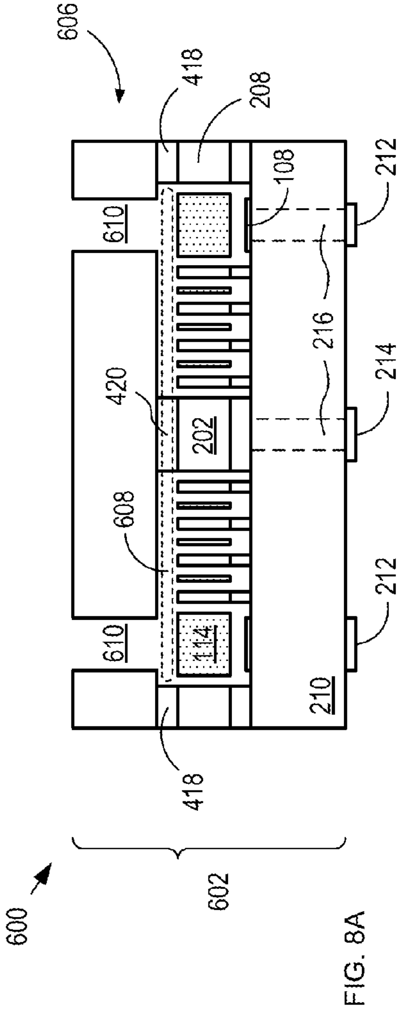
FIG. 8A-D depicts schematic drawings of a cross-section view of integrating impact switch 600 at different points during its fabrication in accordance with the first alternative embodiment of the present invention.

FIG. 8A depicts a schematic drawing of a cross-section view of partially formed integrating impact switch 600 after cylinder layer 606 is bonded to spacer layer 228.

Cylinder layer 606 is a substantially rigid plate of electrically non-conductive material. Cylinder layer 606 comprises a plurality of channels 610, which fluidically couple reservoirs 608 and 620. In some embodiments, cylinder layer 606 comprises surfaces that are treated to facilitate bonding to spacer layers 228 (is this different from 418?) and 618. Cylinder layer 606 is analogous to cap 230 and substrate 210. It should be noted that in embodiments in accordance with the first alternative embodiment, reservoirs 116 and 620, collectively, are analogous to reservoir 116, as described above and with respect to FIG. 1, and reservoir 608 is analogous to reservoir 118, as described above and with respect to FIG. 1. In some embodiments, cylinder layer 606 comprises an electrically conductive material that is electrically insulated from pads 212 and 214 (e.g., by electrically insulating substrate 210).

At operation 702, piston layer 612 is mechanically coupled to throw 114 of switch 602 through channels 610 of cylinder layer 606.

Figure 8B:
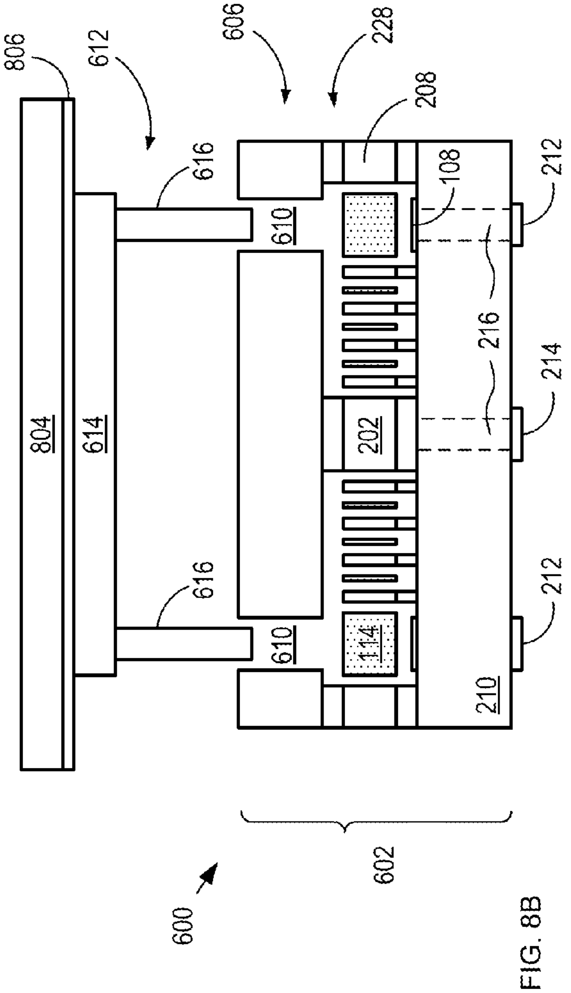

FIG. 8B depicts a schematic drawing of a cross-section view of partially formed integrating impact switch 600 while switch 602 and piston layer 612 are aligned but prior to their being bonded.

Piston layer 612 comprises plate 614 and pistons 616.

Plate 614 is a rigid mechanical plate that is mechanically coupled to pistons 612. In some embodiments, plate 614 comprises one or more holes through its thickness for tailoring the damping characteristics of the plate.

Pistons 616 are rigid rods that are suitable for bonding with throw 114.

In the illustrative embodiment, plate 614 and pistons 616 are formed as a single element via conventional electroplating. In some embodiments, plate 614 and pistons 616 are separate elements that are joined using conventional joining methods, such as thermal bonding, spot welding, brazing, and the like.

Prior to bonding piston layer 612 and switch 602, plate 614 is mechanically coupled handle substrate 804 to facilitate assembly of switch 600. Handle substrate 804 comprises release layer 806, which facilitates release of piston layer 612 from handle substrate 804 after bonding. It will be clear to one skilled in the art, after reading this specification, how to specify, make, and use handle substrate 804 and release layer 806.

Figure 8C:
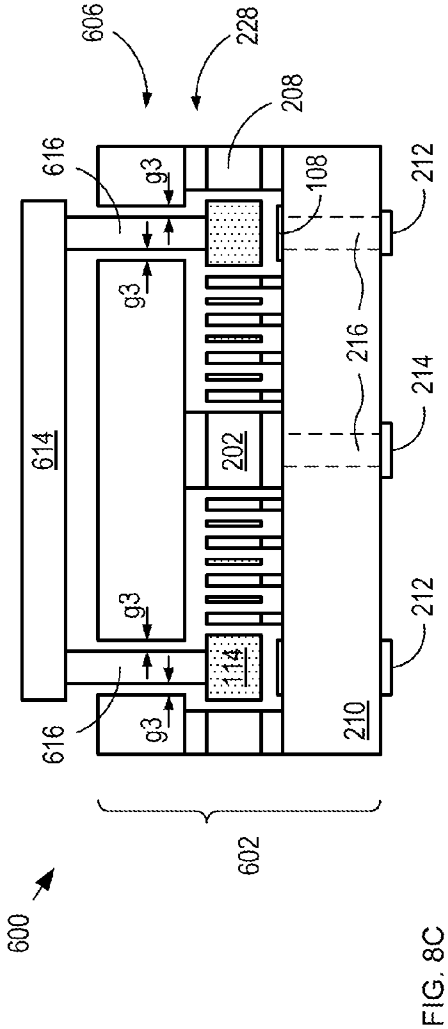

FIG. 8C depicts a schematic drawing of a cross-section view of partially formed integrating impact switch 600 after bonding of piston layer 612 and after removal of release layer 806 and handle wafer 804.

It is an aspect of the present invention that pistons 616 are dimensioned and arranged to fit within channels 610 with a surrounding gap, g3. Like that of gap g2, described above and with respect to FIGS. 4A-F, the width of gap g3 is based on the desired restriction of fluid flow through channels 610. As a result, the width of gap g3 is based on the amount of damping due to viscous flow conditions desired in channels 610.

At operation 703, spacer layer 618 is disposed on cylinder layer 606. Spacer layer 618 is an annulus of electrically non-conductive material. Spacer layer 618 has a thickness that is based on the desired volume of reservoir 620.

In some embodiments, spacer layer 618 a freestanding element that is bonded to cylinder layer 606. In some embodiments, spacer layer 618 is formed on cylinder layer 606 via conventional electroplating methods.

At operation 704, cap layer 230 is bonded to spacer layer 618. Cylinder layer 606, spacer layer 618, and cap 230 collectively define reservoir 620. Reservoir 620 is fluidically coupled to reservoir 608 through holes 610 and is filled with fluid 122.

Figure 8D:
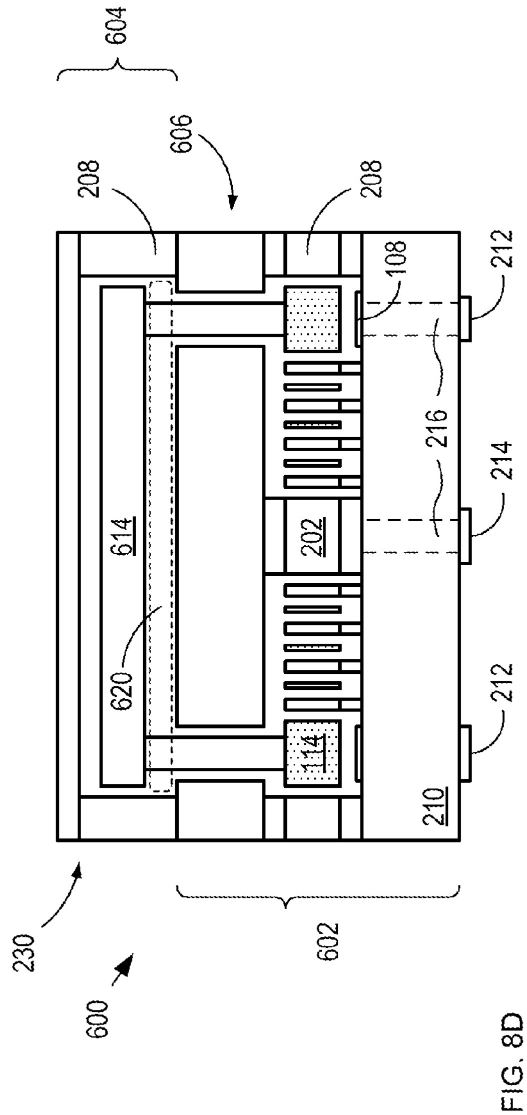

FIG. 8D depicts a drawing of a cross-section view of a completed integrating impact switch 600.

Viscous damper 604 is analogous to a well-known mechanical device that dampens motion of a movable element via viscous friction - the pneumatic dashpot. A pneumatic dashpot retards the motion of the element by providing a damping force that resists the motion. Dashpots are widely used as door closers for screen doors and automobile shock absorbers, for example. In a typical screen door closure system, a spring applies a continuous force to close the door. At the same time, the dashpot slows the motion of the door by coupling its motion to the rate at which fluid flows between two reservoirs. The fluid is forced to flow through a narrow channel between the reservoirs, which limits the flow rate and slows down the motion of the door.

The damping force of such a dashpot is proportional to the velocity of the moving element, but acts in the direction opposite to the element's motion. As a result, the dashpot slows the motion of the element to a substantially steady and gentle movement even while the moving element is subject to continued acceleration.

During actuation of integrating impact switch 600, plate 614 forces fluid 122 from reservoir 620 into reservoir 608 through channels 610. This gives rise to a viscous damping force that resists the motion of throw 114. The damping force of viscous damper 604 is proportional to the velocity of throw 114 as it moves in the negative z-direction toward electrical contact 108; however, the damping force acts in the positive z-direction. As a result, the dashpot slows the motion of throw 114 to a steady and gentle movement even while acceleration 106 continues to act on switch 600. Viscous damper 604, therefore, augments the damped response of switch 602 and facilitates its ability to respond to a predetermined acceleration-time event.

Figure 9:
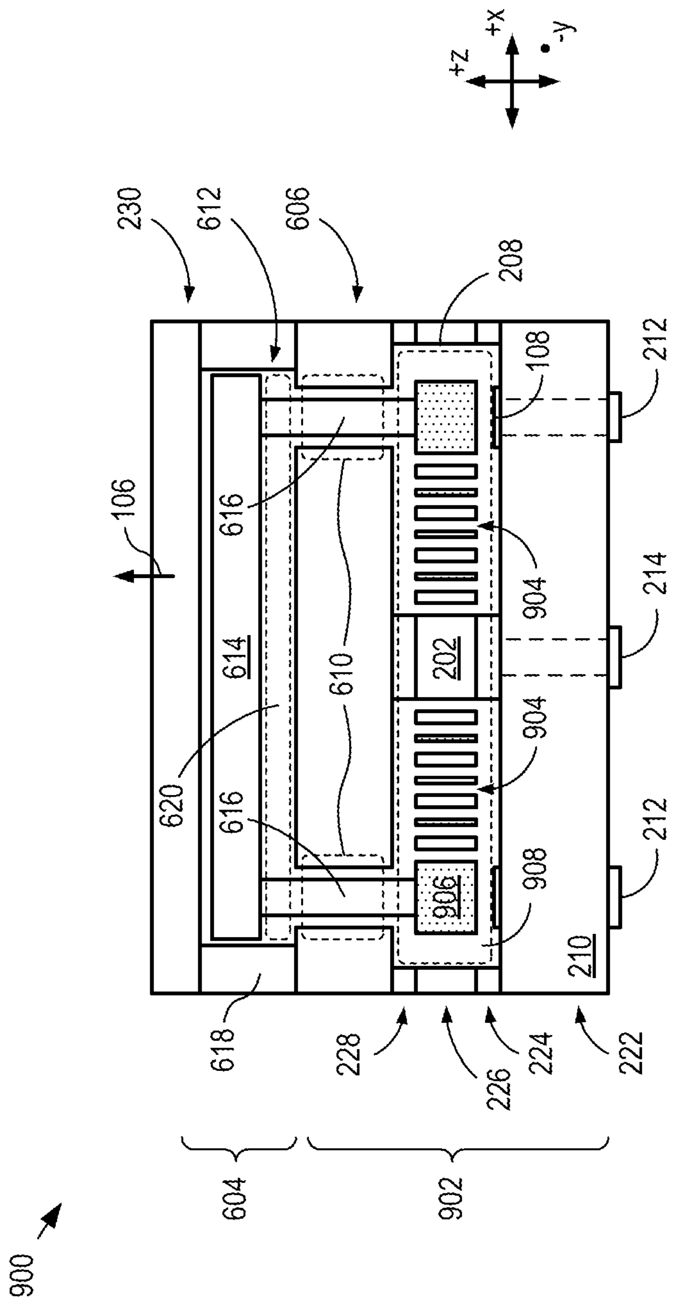
FIG. 9 depicts a schematic drawing of a cross-section view of an integrating impact switch in accordance with a second alternative embodiment of the present invention.

FIG. 9 depicts a schematic drawing of a cross-section view of an integrating impact switch in accordance with a second alternative embodiment of the present invention. Integrating impact switch 900 comprises switch 902 and viscous damper 604, which is mechanically coupled to throw 906 of switch 902.

Switch 902 is a conventional point-detonation switch that is analogous to switches disclosed in U.S. Pat. No. 6,866,160, issued Jul. 20, 2004. Switch 902 comprises anchor 202, tethers 904, and throw 906, which are contained in reservoir 908. Tethers 904 and throw 906 are analogous to tethers 204 and throw 114 described above and with respect to FIGS. 1-4F. It should be noted that in integrating impact switches in accordance with the second alternative embodiment, reservoirs 620 and 908 are analogous to reservoirs 116 and 118, respectively, as described above and with respect to FIG. 1.

Switch 902 does not include barriers 206, however. As a result, reservoir 908 does not constrain fluid 122. Switch 902 does not internally provide significant viscous damping or squeeze-film damping of the motion of throw 906. Switch 902 (in the absence of viscous damper 604), therefore, is susceptible to accidental actuation in response to, for example, inadvertent shock due to handling, vibration, etc. By operatively coupling such a switch with viscous damper 604, however, actuation can be limited to only those events that induce an acceleration component on the switch that (1) exceeds a design threshold and (2) exceeds that threshold for a sustained period of time.

In similar fashion to the operation of integrating impact switch 600, during actuation of integrating impact switch 900, plate 614 forces fluid 122 from reservoir 620 into reservoir 908 through channels 610. This gives rise to a viscous damping force that resists the motion of throw 906. The damping force of viscous damper 604 is proportional to the velocity of throw 906 as it moves in the negative z-direction toward electrical contact 108; however, the damping force acts in the positive z-direction. As a result, the dashpot slows the motion of throw 906 to a steady and gentle movement even while acceleration 106 continues to act on switch 600. Viscous damper 604, therefore, dampens the response of switch 902 and enables it to respond to a predetermined acceleration-time event.

In should be noted that multiple viscous dampers can be "ganged" together to further enhance viscous damping in an integrating impact switch. Such a "stacked" structure can be formed by repeated execution of operations 601 through 603.

It should be noted that examples of impact switches having damped mechanical responses are known in the prior art; however, prior-art integrating impact switches have relied upon the use of eddy-current damping, such as those disclosed in U.S. Pat. No. 8,633,362, issued Dec. 16, 2009. An eddy-current damper uses a large magnet inside of a tube constructed out of a non-magnetic but conducting material (such as aluminum or copper) to produce a resistive force proportional to velocity. Unfortunately, such eddy-current-damped switches are significantly complicated and/or require development of new materials. The present invention avoids some or all of the drawbacks associated with eddy current-damped switches.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A micromechanical switch comprising:

a first electrical contact;

a proof mass comprising a second electrical contact, the proof mass being dimensioned and arranged to move with a first motion relative to the first electrical contact;

a first reservoir containing a first fluid, wherein the volume of the first reservoir is based on a position of the proof mass; and a second reservoir, the second reservoir and first reservoir being fluidically coupled via a first channel;

wherein the first motion is based on (1) a first acceleration of the proof mass and (2) a first flow of the first fluid through the first channel.

2. The switch of claim 1 wherein the first reservoir comprises a region between the first electrical contact and the second electrical contact.

3. The switch of claim 1 further comprising a barrier and a housing, wherein the barrier, housing, and proof mass collectively define the first channel.

4. The switch of claim 3, wherein the barrier and the housing collectively define a second channel, and wherein at least a portion of the proof mass is located within the second channel.

5. The switch of claim 1 further comprising a detonation system, the detonation system being operative for enabling the detonation of a munition when the first electrical contact and second electrical contact are in physical contact.

6. The switch of claim 1 further comprising:

a plate, wherein the plate and the proof mass are mechanically coupled such that the first motion induces motion of the plate, and wherein the plate is located in the first reservoir.

7. The switch of claim 6 further comprising a piston having a first end and a second end, wherein the first end and the proof mass are mechanically coupled, and wherein the second end and the plate are mechanically coupled, and wherein the piston is located in the first channel.

8. The switch of claim 1 further comprising a third reservoir, wherein the second reservoir and third reservoir are fluidically coupled, and wherein the first motion is further based on a second flow of the first fluid between the third reservoir and second reservoir.

9. A switch comprising:

a substrate including;

a first electrical contact, a first bonding region, and a second bonding region;

wherein each of the first electrical contact and bonding region is substantially immovable with respect to the substrate;

a first layer including;

a throw that includes a proof mass and a second electrical contact;

a plurality of tethers, the plurality of tethers being operative for enabling a first motion of the throw with respect to the first electrical contact; and a housing;

wherein the substrate and first layer are joined such that (1) the throw is movable with the first motion and (2) the throw and the housing collectively define a first channel that is fluidically coupled with a first region comprising a first fluid, the first region being between the throw and the first electrical contact; and wherein the first motion is based on (1) an acceleration of the proof mass and (2) a first flow of the first fluid through the first channel.

10. The switch of claim 9 further comprising:

a cap; and a spacer layer;

wherein the first substrate, first layer, the spacer layer, and the cap are joined such that they collectively define a first reservoir; and wherein the first channel fluidically couples the first region and the first reservoir.

11. The switch of claim 9 further comprising a plurality of barriers, wherein the barriers and the throw collectively define a second channel that is fluidically coupled with the first region, and wherein the first motion is further based on (3) a second flow of the first fluid through the second channel.

12. The switch of claim 11 wherein the plurality of barriers and the plurality of tethers collectively define at least one third channel that is fluidically coupled with the first region, and wherein the first motion is further based on (4) a third flow of the fluid through the third channel.

13. The switch of claim 9 further comprising:

a first reservoir that is fluidically coupled with the first region via the first channel;

a second reservoir that is fluidically coupled with the second reservoir via a second channel; and a plate, wherein the plate and the throw are mechanically coupled such that the first motion induces motion of the plate, and wherein the plate is located in the second reservoir;

wherein the first motion is further based on (3) a second flow of the first fluid through the second channel.

14. The switch of claim 13 further comprising a piston having a first end and a second end, wherein first end and the throw are mechanically coupled, and wherein the second end and the plate are mechanically coupled, and wherein the piston is located in the second channel.

* * * * *